(12) United States Patent
Seo et al.

(10) Patent No.: US 9,178,576 B2
(45) Date of Patent: Nov. 3, 2015

(54) COMMUNICATION METHOD USING MULTIPLE TRANSMISSION POINTS, AND APPARATUS FOR SAME

(75) Inventors: Inkwon Seo, Anyang-si (KR); Wonjin Sung, Seoul (KR); Jaewon Kim, Gimpo-si (KR); Jaeyong Park, Seoul (KR); Hyunggil Yoo, Seoul (KR)

(73) Assignees: LG ELECTRONICS INC., Seoul (KR); INDUSTRY-UNIVERSITY COOPERATION FOUNDATION, SOGANG UNIVERSITY, Seoul (KR)

( * ) Notice: Subject to any disclaimer, the term of this patent is extended or adjusted under 35 U.S.C. 154(b) by 128 days.

(21) Appl. No.: 14/233,111

(22) PCT Filed: Jul. 19, 2012

(86) PCT No.: PCT/KR2012/005761
§ 371 (c)(1),
(2), (4) Date: Jan. 15, 2014

(87) PCT Pub. No.: WO2013/012264
PCT Pub. Date: Jan. 24, 2013

(65) Prior Publication Data
US 2014/0161023 A1    Jun. 12, 2014

Related U.S. Application Data

(60) Provisional application No. 61/509,551, filed on Jul. 19, 2011.

(51) Int. Cl.
*H04B 7/02* (2006.01)
*H04B 7/06* (2006.01)
*H04J 11/00* (2006.01)

(52) U.S. Cl.
CPC .............. *H04B 7/024* (2013.01); *H04B 7/0626* (2013.01); *H04J 11/0053* (2013.01)

(58) Field of Classification Search
None
See application file for complete search history.

(56) References Cited

U.S. PATENT DOCUMENTS

| 8,477,705 B2 * | 7/2013 | Luo et al. ...................... 370/329 |
| 8,576,692 B2 * | 11/2013 | Zhang et al. .................. 370/208 |

(Continued)

FOREIGN PATENT DOCUMENTS

| WO | 2010/107242 | 9/2010 |
| WO | 2010/123270 | 10/2010 |

OTHER PUBLICATIONS

CMCC, "Views on the relationship among CoMP sets," 3GPP TSG RAN WG1 meeting #57bis, R1-092822, Jun. 2009, 13 pages.

(Continued)

*Primary Examiner* — Jenee Williams
(74) *Attorney, Agent, or Firm* — Lee, Hong, Degerman, Kang & Waimey

(57) ABSTRACT

The present invention relates to a wireless communication system. More particularly, the present invention relates to a method and apparatus for transmitting channel quality information by a terminal in a wireless communication system, the method comprising: receiving information on a plurality of transmission nodes capable of performing CoMP transmission; transmitting first channel state information on one or more preferred transmission nodes from among the plurality of transmission nodes; receiving pattern information consisting of a plurality of combinations of CoMP sets, each of which corresponds to a relevant time interval according to the pattern information; and performing an operation for transmitting second channel state information on the combination of CoMP sets corresponding to a subframe n.

10 Claims, 9 Drawing Sheets

(56) References Cited

U.S. PATENT DOCUMENTS

2010/0290382 A1* 11/2010 Hui et al. ............ 370/312
2011/0077020 A1* 3/2011 Zangi ............ 455/453
2011/0235608 A1* 9/2011 Koo et al. ............ 370/329
2011/0281585 A1* 11/2011 Kwon et al. ............ 455/436
2012/0087310 A1* 4/2012 Hui et al. ............ 370/328
2012/0120842 A1* 5/2012 Kim et al. ............ 370/252
2013/0010707 A1* 1/2013 Gaal et al. ............ 370/329

OTHER PUBLICATIONS

PCT International Application No. PCT/KR2012/005761, Written Opinion of the International Searching Authority dated Feb. 26, 2013, 16 pages.

* cited by examiner

COMMUNICATION METHOD USING MULTIPLE TRANSMISSION POINTS, AND APPARATUS FOR SAME

CROSS-REFERENCE TO RELATED APPLICATIONS

This application is the National Stage filing under 35 U.S.C. 371 of International Application No. PCT/KR2012/005761, filed on Jul. 19, 2012, which claims the benefit of U.S. Provisional Application Ser. No. 61/509,551, filed on Jul. 19, 2011, the contents of which are hereby incorporated by reference herein in their entirety.

TECHNICAL FIELD

The present invention relates to wireless communication, and more particularly, to a communication method using multiple transmission points and an apparatus for the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention devised to solve the conventional problem is to provide a method for efficiently performing communication using multiple transmission points and an apparatus for the same. Another object of the present invention is to provide a method for efficiently transmitting channel quality information on multiple transmission points and an apparatus for the same. Other object of the present invention is to provide a method for efficiently configuring multiple transmission point sets and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for transmitting channel quality information by a user equipment in a wireless communication system that supports Coordinated Multiple Point (CoMP) transmission and reception comprises the steps of receiving information on a plurality of transmission nodes capable of performing CoMP transmission and reception; transmitting first channel state information on one or more preferred transmission nodes among the plurality of transmission nodes; receiving pattern information configured by a plurality of CoMP set combinations, each of which corresponds to a relevant time interval in accordance with the pattern information; and performing an operation for transmitting second channel state information on the CoMP set combination corresponding to a subframe n, wherein the second channel state information is transmitted when the CoMP set combination corresponding to the subframe n is overlapped with the one or more preferred transmission nodes, and the second channel state information is dropped when the CoMP set combination corresponding to the subframe n is not overlapped with the one or more preferred transmission nodes.

In another aspect of the present invention, a user equipment configured to transmit channel quality information in a wireless communication system that supports Coordinated Multiple Point (CoMP) transmission and reception comprises a radio frequency (RF) unit; and a processor, wherein the processor is configured to receive information on a plurality of transmission nodes capable of performing CoMP transmission and reception, transmit first channel state information on one or more preferred transmission nodes among the plurality of transmission nodes, receive pattern information configured by a plurality of CoMP set combinations, each of which corresponds to a relevant time interval in accordance with the pattern information, and perform an operation for transmitting second channel state information on the CoMP set combination corresponding to a subframe n, wherein the second channel state information is transmitted when the CoMP set combination corresponding to the subframe n is overlapped with the one or more preferred transmission nodes, and the second channel state information is dropped when the CoMP set combination corresponding to the subframe n is not overlapped with the one or more preferred transmission nodes.

Preferably, each of the CoMP set combinations is indicated using a sequence corresponding to the plurality of transmission nodes, a location of an element in the sequence indicates the transmission node, and a value of the element indicates the CoMP set to which the corresponding transmission node belongs.

Preferably, the pattern information is used to indicate N number of CoMP set combinations sequentially corresponding to N number of time intervals, and the processor is configured to transmit third channel state information on the one or more preferred transmission nodes of the plurality of transmission nodes in accordance with a given period after the N number of time intervals pass.

Preferably, the first channel state information is used to determine a weight value for each CoMP set within the possible CoMP set combinations, and the weight value is associated with a probability value of the presence of the corresponding CoMP set within the pattern indicated by the pattern information.

Preferably, the first channel state information is used to determine a weight value for each CoMP set within the possible CoMP set combinations, and the pattern indicated by the pattern information includes CoMP combination only of which preference is more than a specific level on the basis of the weight value.

Advantageous Effects

According to the present invention, communication may efficiently be performed using multiple transmission points in a wireless communication system. Also, channel quality information on transmission points may efficiently be fed back. Also, multiple transmission point sets may efficiently be configured.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the present invention will be described based on the 3GPP LTE/LTE-A, it is to be understood that the technical spirits of the present invention are not limited to the 3GPP LTE/LTE-A.

Figure 1:
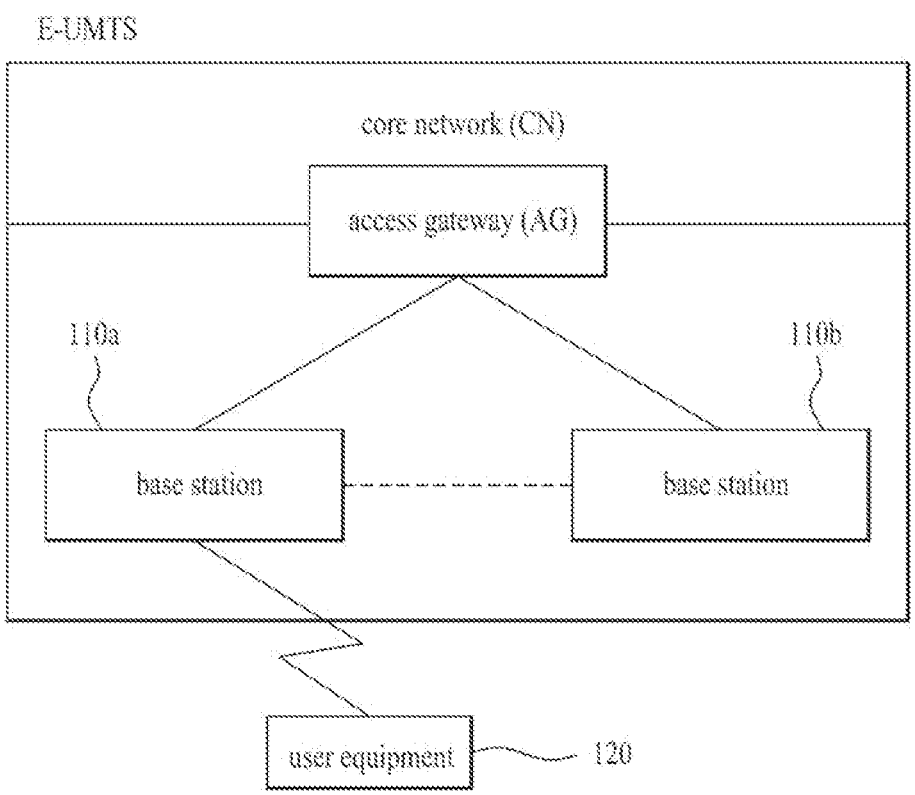
FIG. 1 is a diagram illustrating a network structure of an Evolved Universal Mobile Telecommunications System (E-UMTS)

FIG. 1 is a diagram illustrating a network structure of an Evolved Universal Mobile Telecommunications System (E-UMTS). The E-UMTS is an evolved version of the conventional UMTS, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. The base stations may simultaneously transmit multiple data streams for a broadcast service, a multicast service and/or a unicast service. One or more cells (for example, three cells) exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Figure 2:
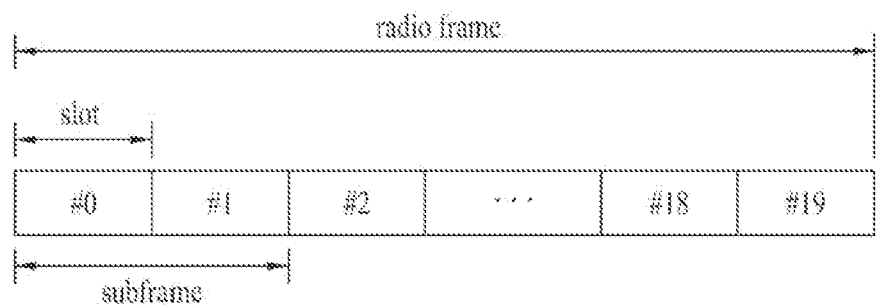
FIG. 2 is a diagram illustrating a structure of a radio frame used in the E-UMTS.

FIG. 2 is a diagram illustrating a structure of a radio frame used in the E-UMTS.

Referring to FIG. 2, the E-UMTS uses radio frames of 10 ms, each of which includes 10 subframes. The subframe includes two continuous slots. Each slot has a length of 0.5 ms, and includes a plurality of symbols (for example, OFDM symbols or SC-FDMA symbols).

Figure 3:
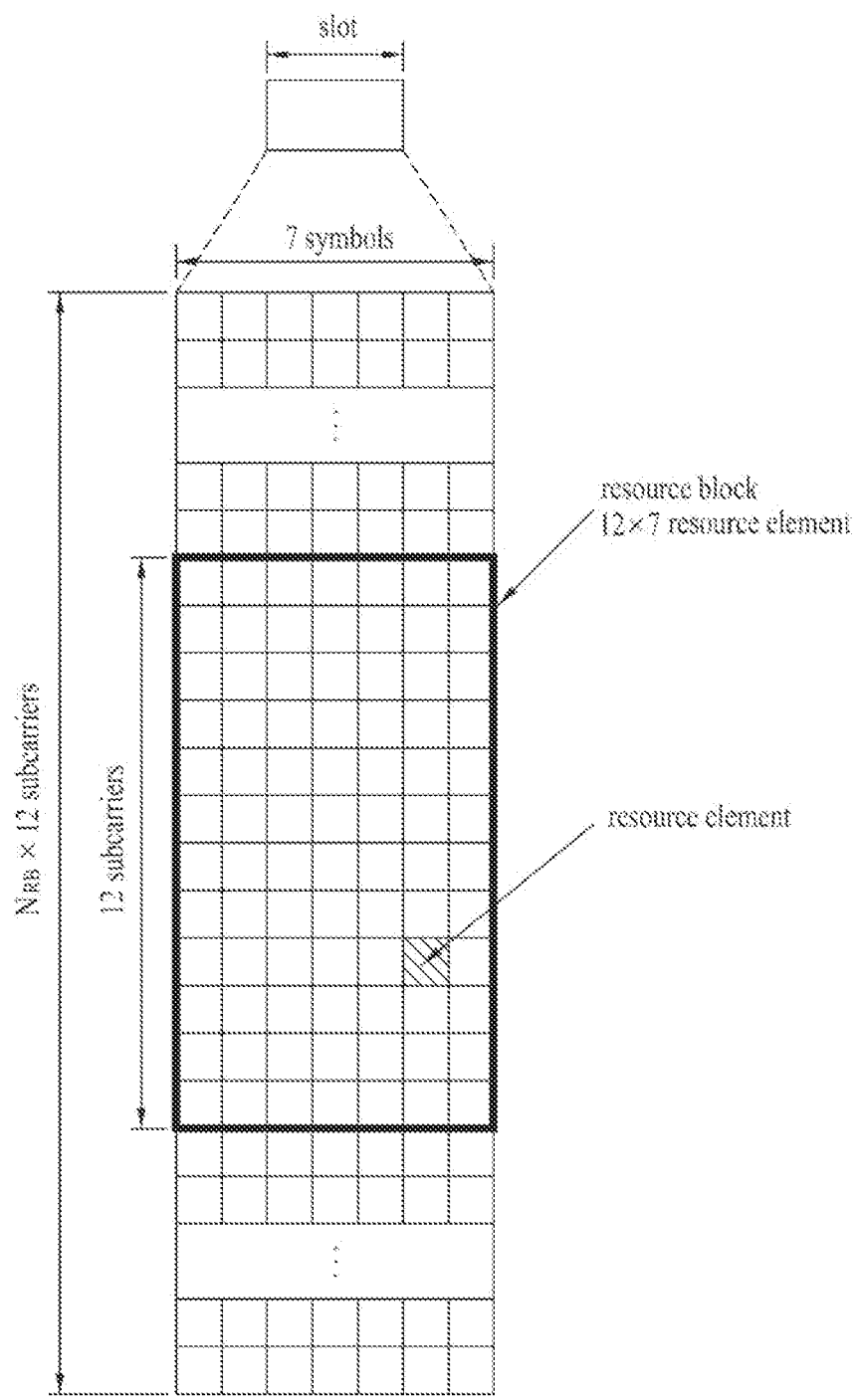
FIG. 3 is a diagram illustrating a resource grid of a radio frame.

FIG. 3 is a diagram illustrating a resource grid of the slot.

Referring to FIG. 3, the slot includes a plurality of OFDM symbols or SC-FDMA symbols, and includes a plurality resource blocks (RBs) in frequency domain. One resource block includes 12×7(6) resource elements. The number of resource blocks (RBs) included in a time slot depends on a frequency bandwidth set in a cell. Each partition on the resource grid represents minimum resources defined by one symbol and one subcarrier, and will be referred to as a resource element (RE). Although FIG. 3 illustrates that the time slot includes seven symbols and the resource block includes twelve subcarriers, the embodiments of the present invention are not limited to the example of FIG. 3. For example, the number of symbols included in the slot may be varied depending on a length of a cyclic prefix (CP).

Figure 4:
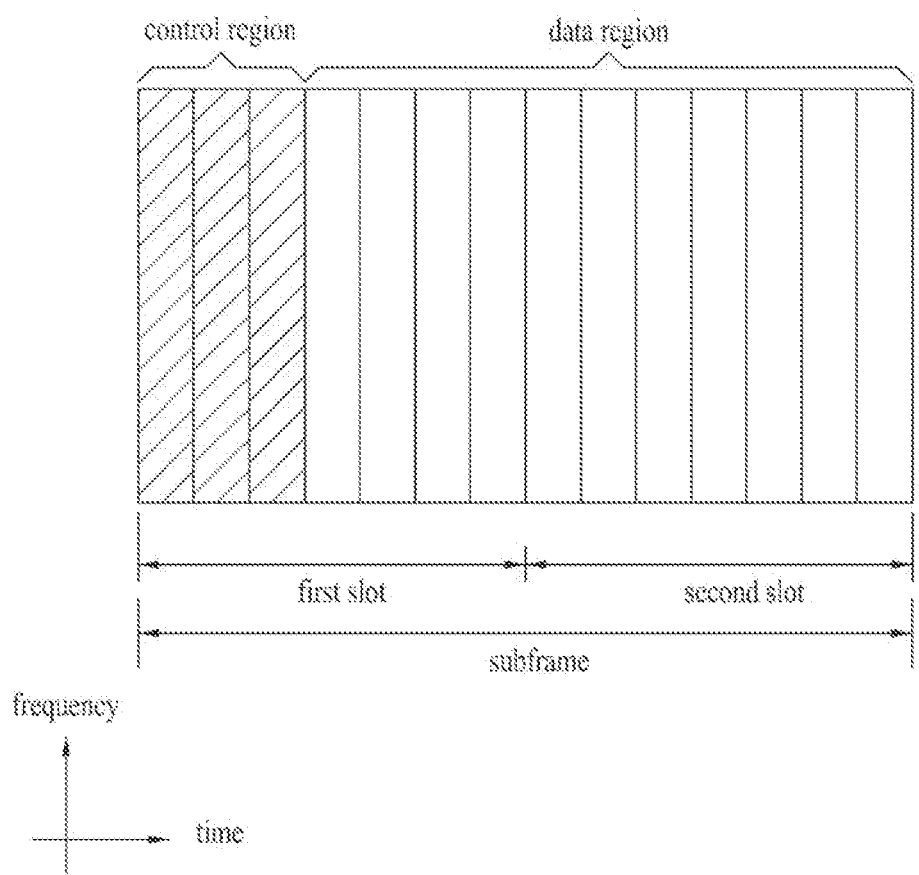
FIG. 4 is a diagram illustrating a structure of a downlink frame.

FIG. 4 is a diagram illustrating a structure of a downlink subframe.

Referring to FIG. 4, a downlink subframe in an LTE system includes L1/L2 control region and a data region, wherein the L1/L2 control region and the data region are multiplexed in accordance with a time division multiplexing (TDM) mode. The L1/L2 control region includes first n (for example, three or four) OFDM symbols of the subframe, and the other OFDM symbols are used for the data region. The L1/L2 control region includes a physical downlink control channel (PDCCH) for carrying downlink control information, and the data region includes a downlink data channel, i.e., a physical downlink shared channel (PDSCH). In order to receive a downlink signal, the user equipment reads out downlink scheduling information from the PDCCH, and receives downlink data on the PDSCH by using resource allocation information indicated by the downlink scheduling information. The resource (that is, PDSCH) scheduled for the user equipment is allocated in a resource block unit or a resource block group unit.

The PDCCH notifies the user equipment of information related to resource allocation of transport channels, i.e., a paging channel (PCH) and a downlink-shared channel (DL-SCH), uplink scheduling grant, HARQ information, etc. The information transmitted through the PDCCH will be referred to as downlink control information (DCI). Various DCI formats are provided depending on the control information.

Table 1 illustrates a DCI format 0 for uplink scheduling.

TABLE 1

| Field | Bits | Comment |
|---|---|---|
| Format | 1 | Uplink grant or downlink assignment |
| Hopping flag | 1 | Frequency hopping on/off |
| RB assignment | 7 | Resource block assigned for PUSCH |
| MCS | 5 | Modulation scheme, coding scheme, etc. |
| New Data Indicator | 1 | Toggled for each new transport block |
| TPC | 2 | Power control of PUSCH |
| Cyclic shift for DMRS | 3 | Cyclic shift of demodulation reference signal |
| CQI request | 1 | To request CQI feedback through PUSCH |
| RNTI/CRC | 16 | 16 bit RNTI implicitly encoded in CRC |
| Padding | 1 | To ensure format 0 matches format 1A in size |
| Total | 38 | — |

MCS: Modulation and Coding Scheme
TPC: Transmit Power Control
RNTI: Radio Network Temporary Identifier
CRC: Cyclic Redundancy Check Information as to a user equipment to which the PDDCH is transmitted is identified using radio network temporary identifier (RNTI). For example, it is assumed that the PDCCH is CRC masked with RNTI called "A," and that uplink allocation information (for example, frequency location) called "B" and transmission format information (for example, transport block size, modulation mode, coding information, etc.) called "C" are transmitted through the PDCCH. In this case, the user equipment located in a corresponding cell monitors the PDCCH using its RNTI information, and the user equipment having RNTI "A" performs uplink transmission in accordance with information of B and C obtained from the PDCCH.

Figure 5:
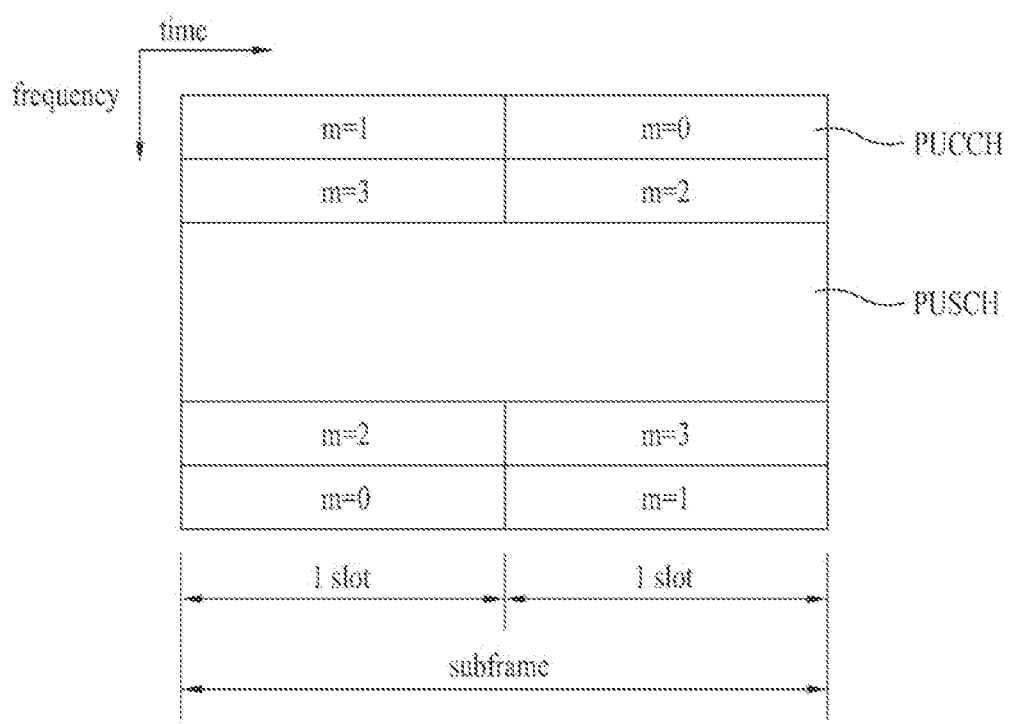
FIG. 5 is a diagram illustrating a structure of an uplink subframe.

FIG. 5 is a diagram illustrating a structure of an uplink subframe in the LTE.

Referring to FIG. 5, the uplink subframe includes a plurality of slots (for example, two slots). The respective slots may include their respective SC-FDMA symbols different from those of the other slots in accordance with a CP length. The uplink subframe may be divided into a control region and a data region on a frequency domain. The data region includes a PUSCH and is used to transmit a data signal such as voice. The control region includes a PUCCH and is used to transmit uplink control information. The PUCCH includes RB pair located at both ends of the data region on a frequency axis, and performs hopping on the border of the slots. The uplink control information includes Hybrid Automatic Retransmit reQuest (HARQ) ACK/NACK for downlink data, and channel (state) information on a downlink. The channel (state) information on the downlink includes a precoding matrix indicator (PMI), a rank indicator (RI), and a channel quality indicator (CQI).

Next, a method for feeding back channel state information will be described. It is required to feed back channel information for efficient communication. To this end, channel information of the downlink is transmitted to the uplink while channel information of the uplink is transmitted to the downlink. This channel information will be referred to as channel state information (CSI). The CSI includes a channel quality indicator (CQI). The CQI may be generated by various methods. Examples of the methods include a method for quantizing a channel state (or spectrum efficiency), a method for calculating a signal to interference and noise ratio (SINR), and a method for notifying an actual status of a channel such as modulation coding scheme (MCS).

The method for generating the CQI on the basis of the MCS will be described in more detail. The CQI may be generated for transmission mode of high speed downlink packet access (HSDPA) in the 3GPP. If the CQI is generated based on the MCS, the MCS includes a modulation scheme, a coding scheme, and a coding rate based on the modulation scheme and the coding scheme. Accordingly, if the modulation scheme and/or the coding scheme is changed, the CQI should be changed correspondingly. For this reason, at least one CQI per codeword is required.

Table 2 illustrates that the CQI is generated by the MCS.

TABLE 2

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

Figure 6:
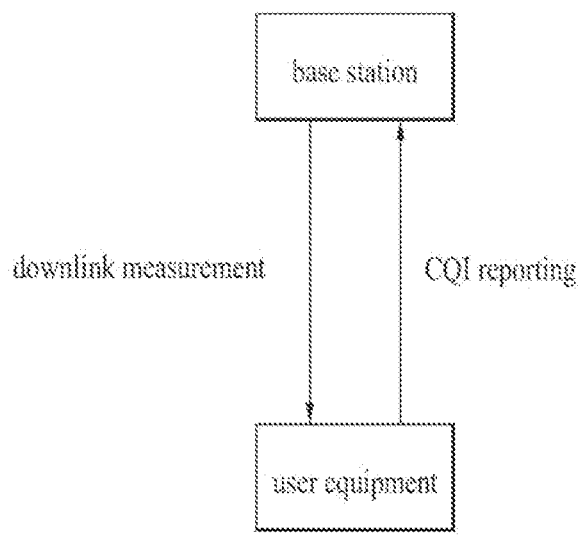
FIG. 6 is a diagram illustrating a procedure of feeding back channel state information.

FIG. 6 is a conceptional diagram illustrating generation and transmission of CQI. The wireless communication system may use link adaptation to use given channel capacity within the maximum range. Link adaptation controls the MCS and a transmission power in accordance with the given channel. To this end, the user should feed channel quality information back to the base station.

Referring to FIG. 6, the user equipment measures downlink quality and reports a CSI (for example, CQI) value selected based on the measured downlink quality to the base station through an uplink control channel. The base station performs downlink scheduling (user equipment selection, resource allocation, etc.) in accordance with the reported CSI. Examples of the CQI value may include a signal to interference and noise ratio (SINR), a carrier to interference and noise ratio (CINR), a bit error rate (BER), a frame error rate (FER), and a value of the FER converted into transmittable data. In case of the MIMO system, the CSI may additionally include information reflecting channel state such as rank information (RI) and precoding matrix information (PMI).

Next, Cooperative Multipoint Transmission/Reception (CoMP) will be described. The post-LTE-A system considers a system that enhances system throughput through coordination between cells. This system will be referred to a Cooperative Multipoint Transmission/Reception (CoMP) system. The CoMP may be referred to as Co-MIMO (Cooperative Multiple Input Multiple Output), collaborative MIMO, network MIMO, etc. The CoMP system means a communication system that two or more base stations, access points or cells perform communication with the user equipment in cooperative with one another to effectively perform communication between a specific user equipment and the base station, access point or cell. In this specification, the base station, the access point, access node, transmission point, transmission node or the cell may be used to refer to the same thing.

Figure 7:
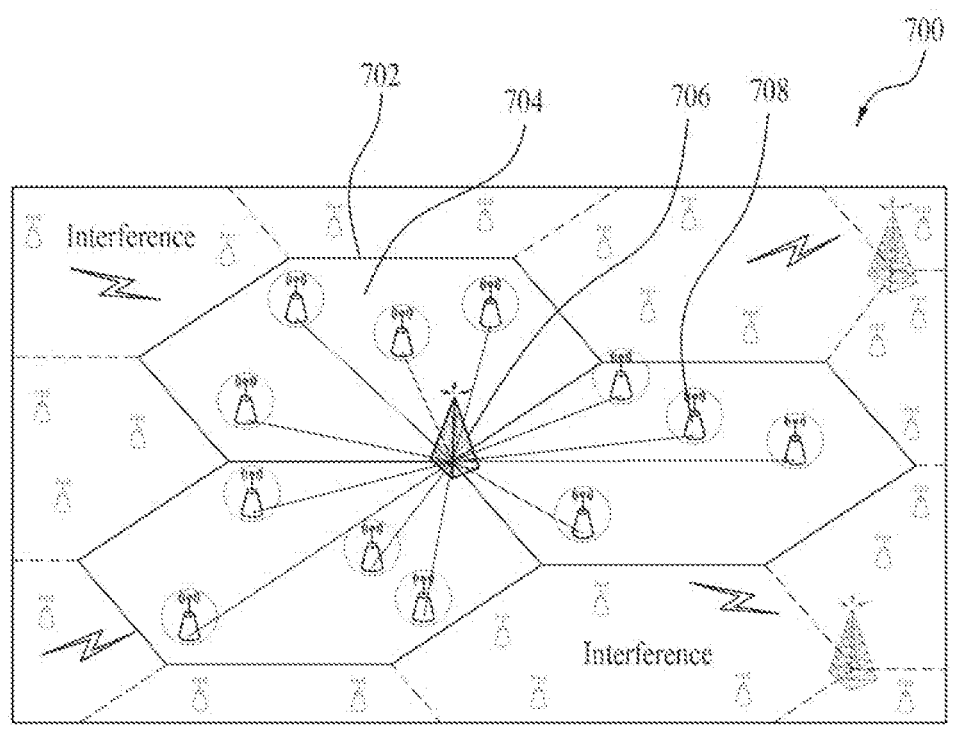
FIG. 7 is a diagram illustrating a cooperative multipoint transmission/reception (CoMP) system.

FIG. 7 is a diagram illustrating an example of a wireless communication system applied to the present invention.

Referring to FIG. 7, the wireless communication system 700 includes a plurality of cells 702, each of which may be divided into a plurality of sectors 704. A macro base station 706 for signal transmission and a micro base station (remote radio head (RRH)) 706 connected with the macro base station 706 through an optical cable may be located in each cell. Generally, in the case that cooperative transmission (that is, CoMP) among a plurality of transmission nodes is not considered, user equipments located within coverage of each transmission node receive a non-cooperative transmission (NCT) type service from the corresponding transmission node. In the case that cooperative transmission (for example, joint transmission (JT)) among the transmission nodes is considered, interference between the transmission nodes may effectively be controlled and transmission efficiency may be enhanced by using multi-user multiple-input multiple output (MIMO) formed between the user equipments included in the corresponding coverage and the transmission nodes included in a cooperative transmission set (hereinafter, referred to as CoMP set).

For cooperative transmission between the transmission nodes, transmission data, signaling, channel information, scheduling information, etc. should be shared between the transmission nodes. If there is limitation in time delay and bandwidth in sharing the information as above, since an advantage based on cooperative transmission is reduced, it is required to limit the transmission node (s), which may perform cooperative transmission, or the range (CoMP region) of the transmission nodes by considering that the advantage based on cooperative transmission is reduced. Meanwhile, since the transmission nodes within the CoMP region are distributed locally, efficiency of cooperative transmission per transmission node may be varied depending on the location of the user equipment that receives a service. Accordingly, considering signaling overhead (for example, channel information feedback, etc.) required for cooperative transmission, it is preferable to include only the transmission nodes having high cooperative transmission efficiency among the transmission nodes within the CoMP region in the CoMP set.

In case of full-CoMP system in which all the transmission nodes within the CoMP region join in cooperative transmission, interference between the transmission nodes may effectively be controlled. However, a problem may occur in that transmission efficiency may be varied depending on the geographical location of the transmission nodes within the CoMP region and the user equipments. Also, considering signaling overhead such as CSI feedback required for cooperative transmission, if the transmission node having low efficiency of cooperative transmission is included in the CoMP set, a problem may occur in that system throughput is lowered.

In order to solve the above problems, the present invention discloses a method for efficiently configuring and managing a CoMP set which is a set of transmission nodes for transmitting a signal in cooperation with one another. In more detail, the present invention includes a protocol related to signaling signals between the system (for example, serving base station or serving transmission node) and the user equipment, a CoMP set combination configuration algorithm, and a CoMP set management system operated on the basis of a pattern determined by the system.

In more detail, in the present invention, a partial CoMP management system that performs cooperative transmission by using some of all the transmission nodes within the CoMP region will be described. The CoMP set that includes some of the transmission nodes is determined by reflecting information of the transmission nodes preferred by the user equipments. Since the preferred transmission nodes may be varied depending on the channel condition of the user equipments, the CoMP set configured by the system may dynamically be changed and managed. The transmission nodes having high efficiency may only join in cooperative transmission in accordance with the suggestion of the present invention, whereby transmission efficiency of the system may be enhanced, and signaling overhead required for cooperative transmission may effectively be reduced.

Hereinafter, 1) the protocol related to the signaling signals to be transmitted and received between the system and the user equipment, 2) the CoMP set combination configuration algorithm, and 3) the CoMP set management scheme operated on the basis of the pattern determined by the system will be described in more detail with reference to the accompanying drawings.

Protocol Related to Signaling Signals

First of all, CoMP region information broadcast signaling will be described. Information used by the user equipment to identify the transmission nodes included in the CoMP region will be defined as CoMP region information broadcast signaling. All or some of the transmission nodes within the CoMP region transmit a downlink signal, which includes CoMP region information broadcast signaling, periodically or non-periodically. In more detail, CoMP region information broadcast signaling may be used to broadcast identification information on each transmission node within the CoMP region and information required to measure a downlink channel state for each transmission node to the user equipment within the CoMP region. The transmission nodes having their respective cell-IDs different from one another within the CoMP region may be identified from one another using cell ID of the corresponding cell. The transmission nodes having the same cell-ID within the CoMP region may be identified from one another using virtual cell-ID or reference signal (for example, cell specific reference signal (CRS), demodulation RS (DMRS), and channel state information RS (CSI-RS)) pattern information uniquely owned by each transmission node. In this case, information such as cell-ID and RS port number is used by the user equipment to detect/measure the downlink signal of each transmission node.

The information on each transmission node within the CoMP region information broadcast signaling signal may be arranged in accordance with an order which is previously determined. In this case, the transmission nodes within the CoMP region may be indicated more briefly and clearly than the case where the user equipment or the system selectively indicates the transmission nodes within the CoMP region on the uplink/downlink. For example, if the user equipment indicates its preferred transmission node to the system, the user equipment may set the bit corresponding to the corresponding transmission node to 1 at a bit map corresponding to the transmission node arrangement order.

Table 3 illustrates information included in the CoMP region information broadcast signaling. In this example of Table 3, it is assumed that M number of transmission nodes are included in the CoMP region.

TABLE 3

|  | $Node_1$ | $Node_2$ | $Node_3$ | ... | $Node_M$ |
|---|---|---|---|---|---|
| Unique information per transmission node (for example, cell-ID or signal pattern information) | $I_1$ | $I_2$ | $I_3$ | ... | $I_M$ |

Next, preferred CoMP set feedback signaling per user equipment will be described. The user equipment may select transmission nodes within the CoMP region that satisfies the reference determined by itself or the reference indicated by the system, and may determine the selected transmission nodes as a preferred CoMP set. The absolute or relative reference to be satisfied by the transmission nodes may be used. An application example of the absolute reference includes selecting transmission nodes of which received power or signal to interference and noise ratio (SINR) is more than a specific level. An application example of the relative reference includes selecting transmission nodes of which received power or SINR is within the range of TdB as compared with the greatest transmission node.

The user equipment may include the selected preferred CoMP set information in the preferred CoMP set feedback signaling per user equipment and report it to the system (for example, serving base station or serving transmission node). Although the suggested signaling may have various types, it may preferably be signaling that includes sequence of M bits considering the CoMP region that includes M number of transmission nodes. For example, each user equipment may perform report using the sequence of M bits defined as expressed by the following Equation 1.

Preferred CoMP set information=$b_1 b_2 b_3 \ldots b_M$ [Equation 1]

In this case, $b_m$ has a value of 1 if a node #m aligned in due order by the CoMP region information broadcast signaling is included in the preferred CoMP set, but has a value of 0 if not so. Likewise, the system that has been reported the information of the Equation 1 may identify a transmission node, into which the node #m having a value of $b_m=1$ is mapped, by referring to the alignment order of the transmission nodes illustrated in Table 3.

Next, CoMP set combination information signaling will be described. The system (for example, serving base station or serving transmission node) may perform the CoMP set combination configuration algorithm, which will be described later, on the basis of the preferred CoMP set information reported by the user equipment and configure the CoMP set to be used for actual signal transmission. The configuration type of the CoMP set determined by the system may be transmitted by being included in the CoMP set combination information signaling, and the user equipment may identify cooperative transmission of the transmission nodes and transmission nodes, which transmit a signal in cooperation with each other, by interpreting the corresponding signaling. Although the suggested signaling may have various types, it may preferably include sequence expressed by the following Equation 2.

In The Equation 2, it is assumed that a total number of transmission nodes are M and a total number of CoMP sets configured by the system are L.

Configured CoMP set information=$l_1 l_2 l_3 \ldots l_M$ [Equation 2]

In this case, $l_m$ has a value of one of elements $\{1, \ldots, L\}$ depending on what CoMP set that includes the node#m is. For example, if the p-th CoMP set is defined as $set_p = \{m_1, m_2, \ldots, m_K\}$, $l_m = p$ ($m=m_1, m_2, \ldots, m_K$) may be obtained in the Equation 2. In other words, a number of the CoMP set to which each node belongs is written in the location of the corresponding transmission node. Bits corresponding to each transmission node are varied depending on the number of CoMP sets. For example, each transmission node may be expressed as ceil($\log_2 L$) number of bits, wherein ceil is a ceiling function and L represents the number of CoMP sets. One transmission node may be allocated to one CoMP set only or a plurality of CoMP sets. If one transmission node is allocated to a plurality of CoMP sets, the bits corresponding to each transmission node may be increased depending on a level of repeated allocation.

Table 4 illustrates a CoMP set combination when the CoMP region includes three transmission nodes. If the first combination $set_a = \{node_1\}$, $set_2 = \{node_2\}$, $set_3 = \{node_3\}$ is selected, the CoMP set may be expressed as "1 2 3" in the Equation 2. In case of the second combination $set_1 = \{node_1, node_2\}$, $set_2 = \{node_3\}$, the CoMP may be expressed as "1 1 2" in the Equation 2.

TABLE 4

| CoMP set information generated per combination |
|---|
| Combination 1   $set_1 = \{node_1\}$, $set_2 = \{node_2\}$, $set_3 = \{node_3\}$ |
| Combination 2   $set_1 = \{node_1, node_2\}$, $set_2 = \{node_3\}$ |
| Combination 3   $set_1 = \{node_1, node_3\}$, $set_2 = \{node_2\}$ |
| Combination 4   $set_1 = \{node_2, node_3\}$, $set_2 = \{node_1\}$ |
| Combination 5   $set_1 = \{node_1, node_2, node_3\}$ |

CoMP set combination information signaling may be broadcasted or unicasted. Broadcast signaling may be used to transfer CoMP set information which will be configured by the system, and each user equipment may decide whether to request scheduling and perform CSI feedback depending on preference of the CoMP set to be configured by the system. On the other hand, unicast signaling may be used to transfer CoMP set information which is currently configured by the system, to the corresponding user equipment. In more detail, unicast signaling may notify the corresponding user equipment which transmission node or CoMP set will provide a service. Accordingly, broadcast signaling may be transferred before scheduling per transmission node or CoMP set is performed, whereby broadcast signaling may be used for decision making of each user equipment. Unicast signaling may be used to report a detailed transmission status to the user equipment.

In the meantime, CoMP set combination information signaling may be transferred independently per CoMP transmission scheme. For example, if coordinated beamforming (CB) and JT are considered, CoMP set combination information for CB and CoMP set combination information for JT may be generated independently using the Equation 2 and then transferred to the user equipment. The user equipment may acquire CoMP set information corresponding to each cooperative transmission scheme through the CoMP set combination information for CB and the CoMP set combination information for JT.

CoMP Set Combination Configuration Algorithm

Next, on the basis of feedback information acquired through preferred CoMP set feedback signaling per user equipment, a scheme for configuring CoMP set combinations to be used for signal transmission in the system (for example, serving base station or serving transmission node) will be suggested. In more detail, the system estimates preference of the user equipments for a plurality of candidate CoMP set combinations which may be configured, and generation of a pattern for selectively using the plurality of candidate CoMP set combinations by reflecting the preference of the user equipments for the plurality of candidate CoMP set combinations will be suggested.

Although the suggested algorithm may be implemented in various forms, one implementation example will be described for the operation principle of the suggested scheme. First of all, the system having the CoMP region that includes M number of transmission nodes may generate candidates of the CoMP set combinations that may be configured. For example, in case of M=3, five CoMP set combinations may be generated as illustrated in Table 4. A weight value may be given to the candidate CoMP set combinations by using the preferred CoMP set information reported by each user equipment. Weight values of the candidate CoMP set combinations Combination$_1$, Combination$_2$, ..., Combination$_C$ may be determined as values $w_1, w_2, \ldots, w_C$ proportional to the number of user equipments that prefer the corresponding CoMP set combination. The sum of the weight values $w_1, w_2, \ldots, w_C$ of the CoMP set combination may be normalized to satisfy $$\sum_{i=1,\ldots,C} w_i = 1.$$

In this case, C may be determined considering the number of all the cases of the combinations that may be configured depending on the number of transmission nodes within the CoMP region. Meanwhile, combinations corresponding to high rank X % (0<X<100) may selectively be used on the basis of the preference or weight value calculated per CoMP set combination to determine a new value of C which is smaller than the existing value.

After the weight value per CoMP set combination is determined, N number of samples may randomly be selected using {Combination$_1$, Combination$_2$, ..., Combination$_C$} as sample space, whereby a pattern configured by N number of CoMP set combinations (which permits repetition) may be generated as illustrated in Table 5.

TABLE 5

| n = 1 | n = 2 | n = 3 | n = 4 | n = 5 | ... | n = N |
|---|---|---|---|---|---|---|
| Combination$_3$ | Combination$_2$ | Combination$_3$ | Combination$_4$ | Combination$_1$ | ... | Combination$_3$ |

When the pattern is configured, the weight value may be used as a probability value for selecting a corresponding CoMP set combination. For example, if C=10, N=1000 and all the CoMP set combinations have the same preference (that is, $w_1=w_2=\ldots=w_{10}=0.1$), there is probability that the respective CoMP set combinations may be distributed in about 100 number of random locations or designated locations within the generated pattern. For example, if one CoMP set combination is applied to one subframe and N=1000, a pattern corresponding to 1000 subframes may exist. Meanwhile, new preference may be fed back from the user equipment to the system after 1000 subframes, or the system may request the user equipment to feed preference back thereto in the middle of 1000 subframes.

Figure 8:
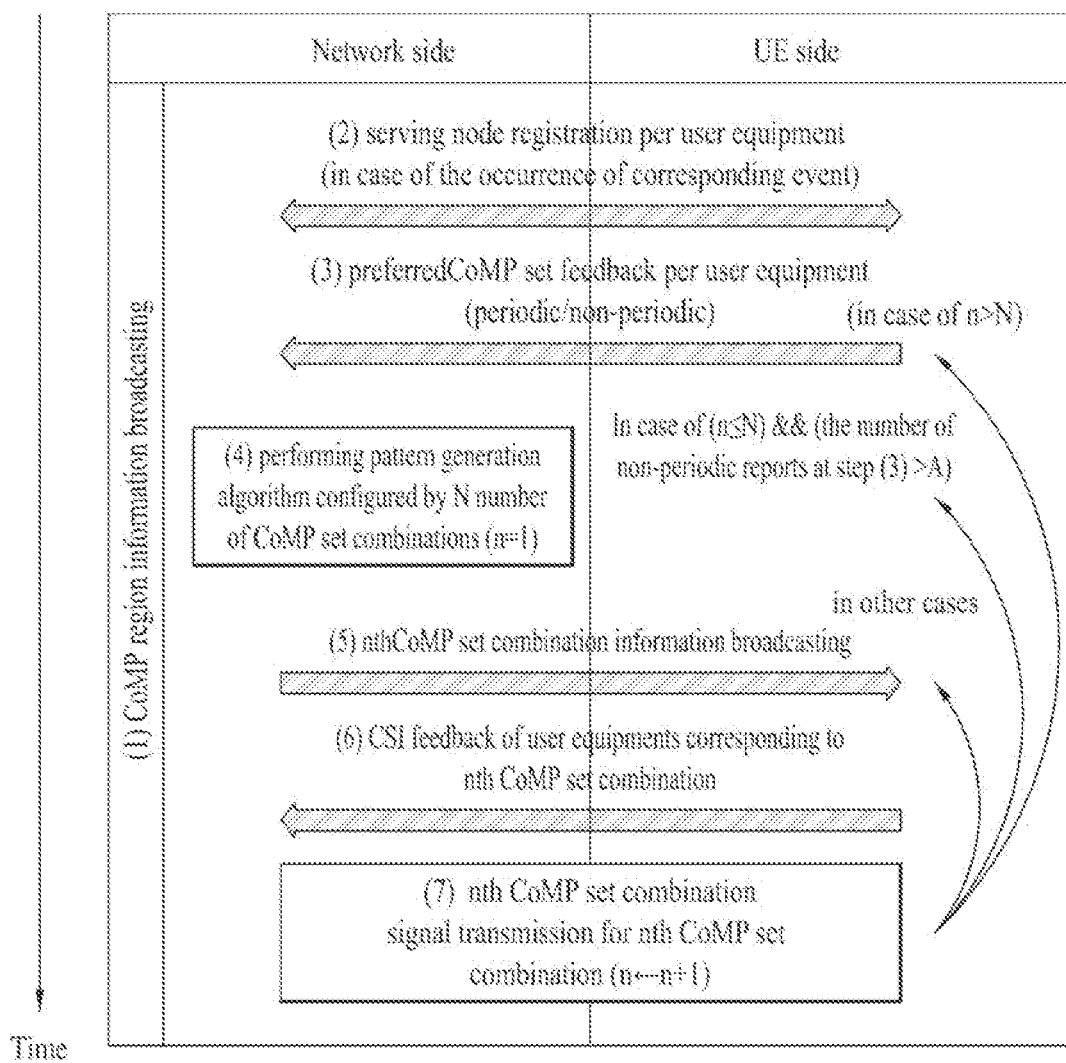
FIG. 8 is a diagram illustrating a method for configuring a CoMP set in accordance with the embodiment of the present invention.

FIG. 8 is a diagram illustrating a method for managing a CoMP set in accordance with the embodiment of the present invention. Referring to FIG. 8, the method for managing a CoMP set may be performed as follows. In FIG. 8, the system may be replaced with a network device, a serving base station, a serving transmission node, etc.

(1) The step of broadcasting CoMP region information
  ① All or some of the transmission nodes within the CoMP region may transmit a downlink signal, which includes CoMP region information broadcast signaling, to the user equipment periodically or non-periodically.

(2) The step of registering a serving node per user equipment (when a corresponding event occurs)
  ① Each user equipment may select the most preferred transmission node from the transmission nodes within the CoMP region as a serving node and register the selected node with the system.
  ② This step may be performed when there is any change in the transmission node preferred by each user equipment or when the system commands change of the serving node.

(3) The step of feeding back preferred CoMP set per user equipment (periodic or non-periodic)
  ① Each user equipment within the CoMP region may report preferred CoMP set feedback signaling per user equipment to the system. In this case, the preferred CoMP set per user equipment may be fed back using the sequence configured in the form of the Equation 1.
    This step may be performed non-periodically or periodically at the time when it is commanded by the system, or may be performed non-periodically in accordance with the decision of the user equipment.

(4) The step of performing algorithm that includes N number of CoMP set combinations
  ① The system generates a pattern, which includes N number of CoMP set combinations (that permit repetition) as illustrated in the example of Table 5, by performing the CoMP set combination configuration algorithm suggested in the present invention.
    Reset to n=1

(5) The step of broadcasting the n-th CoMP set combination information
  The system may select the n-th allocated combination on the basis of the pattern generated at the step (4) and transfer the CoMP set combination information signaling, which includes the selected corresponding information, to the user equipments within the CoMP region in the form of broadcast. In this case, the CoMP set combination information may be broadcasted using the sequence configured in the form of the Equation 2.

(6) The step of feeding back CSI of user equipment(s) corresponding to the n-th CoMP set combination
  ① The CSI may be fed back from the user equipment(s) corresponding to the n-th CoMP set combination to the system.
    In this case, CSI feedback may be allowed for only the user equipment(s) of which preferred CoMP set reported at the step (3) is overlapped with at least one of L number of CoMP sets included in the n-th combination. For example, it is assumed that the user equipment is configured to perform the operation for transmitting CSI feedback for the CoMP set combination (for example, n-th combination) corresponding to the subframe n. In this case, if the n-th combination is overlapped with the preferred CoMP set or one or more transmission nodes that include the preferred CoMP set, CSI feedback for the n-th combination may be allowed. On the other hand, if the n-th combination is not overlapped with the preferred CoMP set or one or more transmission nodes that include the preferred CoMP set, CSI feedback transmission for the n-th combination may be dropped. In this example, CSI frame for the subframe n (that is, n-th combination) may be transmitted for the subframe n+k (k: positive integer).

(7) The step of performing scheduling & precoding and signal transmission for n-th CoMP set combination ① L number of CoMP sets of the n-th combination may perform independent or complementary scheduling by using the CSI feedback of the step (6).

② The transmission nodes within the respective CoMP sets may perform precoding and signal transmission for the scheduled user equipments in cooperation with each other. At this time, the system may notify the respective user equipment(s) scheduled in the form of unicast which transmission node or CoMP set will provide a service to the respective user equipment(s), through the CoMP set combination information signaling.

③ After ① and of this step are repeated for a time or the number of times defined by the system, update such as n←n+1 may be performed.

④ At this time, if n>N is satisfied, the current step moves to the step (3), whereby the system may be reported preferred CoMP set feedback signaling per user equipment from the corresponding user equipment. In this case, feedback signaling may be reported in accordance with a periodic system, that is, a given period.

⑤ Otherwise, in case of n≤N,

If the non-periodic preferred CoMP set feedback per user equipment, which occurs in accordance with an arbitrary decision of the user equipment or the command of the system as described in the step (3), is more than a specific threshold value (or is different from the existing preferred CoMP set at a certain level), the current step moves to the step (4), and if not so, the current step moves to the step, whereby algorithm may be performed.

In respect of the step (3), if the information on the CoMP set preferred by each user equipment is transferred in the form of the Equation 1, the preferred transmission node or CoMP set may be reported exactly using bits equivalent to the number of the transmission nodes existing in the CoMP region. Meanwhile, if cooperative transmission is performed using the transmission nodes having their respective cell-IDs different from one another, since channel power values of the neighboring transmission nodes are conventionally fed back to the system to perform handover, an advantage may little be obtained by defining additional bit streams for the preferred CoMP set feedback. However, if cooperative transmission is performed using the transmission nodes having the same cell-ID as one another, since feedback for handover has not been defined conventionally, the suggested scheme may be used usefully.

In respect of the steps (5) and (6), the system may configure the CoMP set of the present moment, and only the user equipment(s), which prefer(s) the configured CoMP set, may join in CSI feedback, whereby feedback resource may be managed efficiently. In other words, not all the user equipments within the CoMP region join in feedback, but some user equipments, which are determined to be suitable for receiving a service from the CoMP set, join in feedback, whereby feedback channel resources may be saved. Generally, for CSI feedback, the user equipment should request the system of the feedback channel resource for feedback, and the system should allocate the corresponding feedback resource to the user equipment. However, according to the suggested scheme, since the CoMP set information preferred by each user equipment is fed back at the step (3), the system may previously identify the user equipment(s) that require(s) resource allocation for CSI feedback. Accordingly, the step of requesting the feedback resource through the user equipment and accepting the requested feedback resource through the system may be omitted, whereby time delay and signaling overhead may be reduced.

According to the present invention, the CoMP set for transmitting a signal in cooperation among the plurality of transmission nodes locally distributed may be configured and managed efficiently, whereby interference between the transmission nodes, which is one of factors of throughput deterioration in cellular mobile communication that considers non-cooperative transmission only, may be reduced effectively. Also, according to the suggested scheme, since the cooperative transmission nodes constituting the CoMP set are varied depending on their periphery conditions, the CoMP set boundary is not fixed. For this reason, throughput deterioration caused by interference occurring in the boundary between the fixed CoMP sets may be avoided.

Figure 9:
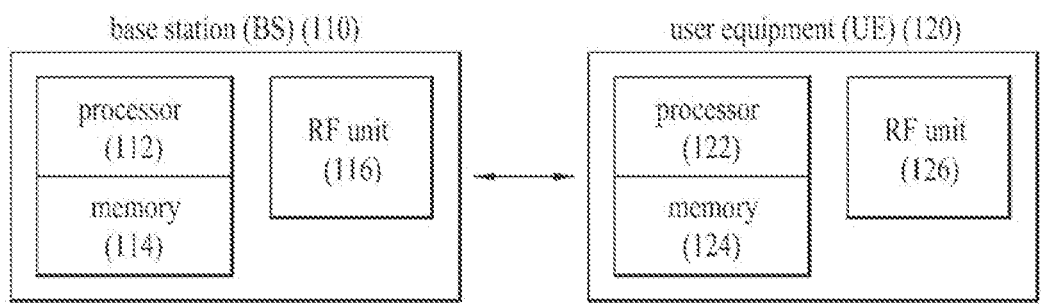
FIG. 9 is a block diagram illustrating a base station and a user equipment, which can be applied to the embodiment of the present invention.

FIG. 9 is a diagram illustrating a base station and a user equipment, which may be applied to the embodiment of the present invention.

Referring to FIG. 9, the wireless communication system includes a base station (BS) 110 and a user equipment (UE) 120. On a downlink, a transmitter is a part of the base station 110 and a receiver is a part of the user equipment 120. On an uplink, the transmitter is a part of the user equipment 120 and the receive is a part of the base station 110. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas. Also, although not shown, the user equipment 120 may further include at least one of a power management module, a battery, a display, a keypad, an SIM card (option), a speaker and a microphone.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention may be applied to a wireless communication system. In more detail, the present invention may be applied to a CoMP based communication method in a wireless communication system and an apparatus for the same.

The invention claimed is:

1. A method for transmitting channel quality information by a user equipment in a wireless communication system that supports Coordinated Multiple Point (CoMP) transmission and reception, the method comprising:
receiving information according to a plurality of transmission nodes capable of performing CoMP transmission and reception;
transmitting first channel state information according to one or more preferred transmission nodes among the plurality of transmission nodes;
receiving pattern information configured by a plurality of CoMP set combinations, each of which corresponds to a relevant time interval in accordance with the pattern information; and
performing an operation for transmitting second channel state information according to a CoMP set combination corresponding to a subframe n,
wherein the second channel state information is transmitted when the CoMP set combination corresponding to the subframe n is overlapped with the one or more preferred transmission nodes, and the second channel state information is dropped when the CoMP set combination corresponding to the subframe n is not overlapped with the one or more preferred transmission nodes.

2. The method according to claim 1, wherein each of the CoMP set combinations is indicated using a sequence corresponding to the plurality of transmission nodes, a location of an element in the sequence indicates a transmission node, and a value of the element indicates a CoMP set to which a corresponding transmission node belongs.

3. The method according to claim 1, wherein the pattern information is used to indicate N number of CoMP set combinations sequentially corresponding to N number of time intervals, the method further comprising the step of transmitting third channel state information on the one or more preferred transmission nodes of the plurality of transmission nodes in accordance with a given period after the N number of time intervals pass.

4. The method according to claim 1, wherein the first channel state information is used to determine a weight value for each CoMP set within possible CoMP set combinations, and the weight value is associated with a probability value of a presence of a corresponding CoMP set within the pattern indicated by the pattern information.

5. The method according to claim 4, wherein the first channel state information is used to determine a weight value for each CoMP set within the possible CoMP set combinations, and the pattern indicated by the pattern information includes CoMP combination only of which preference is more than a specific level on a basis of the weight value.

6. A user equipment configured to transmit channel quality information in a wireless communication system that supports Coordinated Multiple Point (CoMP) transmission and reception, the user equipment comprising:
a radio frequency (RF) unit; and
a processor coupled to the RF unit,
wherein the processor is configured to:
receive information on a plurality of transmission nodes capable of performing CoMP transmission and reception,
transmit first channel state information according to one or more preferred transmission nodes among the plurality of transmission nodes,
receive pattern information configured by a plurality of CoMP set combinations, each of which corresponds to a relevant time interval in accordance with the pattern information, and
perform an operation for transmitting second channel state information according to a CoMP set combination corresponding to a subframe n,
wherein the second channel state information is transmitted when the CoMP set combination corresponding to the subframe n is overlapped with the one or more preferred transmission nodes, and the second channel state information is dropped when the CoMP set combination corresponding to the subframe n is not overlapped with the one or more preferred transmission nodes.

7. The user equipment according to claim 6, wherein each of the CoMP set combinations is indicated using a sequence corresponding to the plurality of transmission nodes, a location of an element in the sequence indicates a transmission node, and a value of the element indicates a CoMP set to which a corresponding transmission node belongs.

8. The user equipment according to claim 6, wherein the pattern information is used to indicate N number of CoMP set combinations sequentially corresponding to N number of time intervals, and the processor is further configured to transmit third channel state information on the one or more preferred transmission nodes of the plurality of transmission nodes in accordance with a given period after the N number of time intervals pass.

9. The user equipment according to claim 6, wherein the first channel state information is used to determine a weight value for each CoMP set within possible CoMP set combinations, and the weight value is associated with a probability value of a presence of a corresponding CoMP set within the pattern indicated by the pattern information.

10. The user equipment according to claim 9, wherein the first channel state information is used to determine a weight value for each CoMP set within the possible CoMP set combinations, and the pattern indicated by the pattern information includes CoMP combination only of which preference is more than a specific level on a basis of the weight value.

* * * * *